United States Patent
Moon et al.

(10) Patent No.: US 8,682,276 B2
(45) Date of Patent: Mar. 25, 2014

(54) BROADCAST COMMUNICATION OR MULTICAST COMMUNICATION-CAPABLE MOBILE STATION

(75) Inventors: Sung Uk Moon, Yokosuka (JP); Minami Ishii, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1413 days.

(21) Appl. No.: 10/569,067

(22) PCT Filed: Aug. 20, 2004

(86) PCT No.: PCT/JP2004/012025
§ 371 (c)(1),
(2), (4) Date: Oct. 11, 2006

(87) PCT Pub. No.: WO2005/020470
PCT Pub. Date: Mar. 3, 2005

(65) Prior Publication Data
US 2007/0091882 A1    Apr. 26, 2007

(51) Int. Cl.
*H04B 1/00*    (2006.01)
(52) U.S. Cl.
USPC ............ 455/312; 455/503; 455/517; 455/518
(58) Field of Classification Search
USPC ....................................................... 455/312
See application file for complete search history.

(56) References Cited

U.S. PATENT DOCUMENTS

| 6,704,576 B1 * | 3/2004 | Brachman et al. ............ 455/503 |
| 2003/0112778 A1 | 6/2003 | Lundby | |
| 2003/0112810 A1 | 6/2003 | Nakabayashi et al. | |
| 2005/0013326 A1 * | 1/2005 | Vinagre ........................ 370/522 |
| 2006/0056341 A1 * | 3/2006 | Takagi et al. ................. 370/328 |

FOREIGN PATENT DOCUMENTS

| EP | 1 213 934 A2 | 6/2002 |
| EP | 1 217 854 A1 | 6/2002 |
| JP | 07-336366 | 12/1995 |
| JP | 2003-174452 | 6/2003 |
| JP | 2003-188818 | 7/2003 |
| WO | WO 01/58108 A2 | 8/2001 |
| WO | WO 01/65868 A1 | 9/2001 |

OTHER PUBLICATIONS

3GPP TS 23.041, V6.2.0, Release 6, 2003.
3GPP TS 25.324 V6.1.0, Release 6, 2004.

* cited by examiner

*Primary Examiner* — Ajibola Akinyemi
(74) *Attorney, Agent, or Firm* — Oblon, Spivak, McClelland, Maier & Neustadt, L.L.P.

(57) ABSTRACT

It is an object of the present invention to provide a mobile station which enables transmission of control information on broadcast communication or multicast communication to a radio network controller without establishing a dedicated channel in broadcast communication or multicast communication. The mobile station related to this invention includes a control information generating unit (14) for generating control information on broadcast communication or multicast communication, a control information identifier adding unit (15, 16, 17) for adding a control information identifier for specifying a type of the control information to the control information, and a transmitting unit (12) for transmitting the control information to a radio network controller (RNC) via a common channel.

4 Claims, 7 Drawing Sheets ced in FIG. 1,
one or more base stations BS simultaneously transmit the
same information to an unspecified large number of mobile
stations UE (User Equipments) in a given cell or cells (e.g.,
see non-patent literature 1).

Also, in the conventional mobile communication systems,
multicast communication has been known in which, as shown
in FIG. 2, the same information is transmitted to a plurality of
mobile stations UE belonging to a particular group (e.g., see
non-patent literature 2).

Mobile stations UE used in the conventional mobile communication systems have two types of mode, "Idle mode" and "Connected mode", as shown in FIG. 3.

The "Idle mode" is a mode in which an RRC (Radio Resource Control) connection is not established between the mobile station UE and a radio network controller RNC, that is, a mode in which a radio network controller RNC does not need to keep track of location information on the mobile station UE. On the other hand, the "Connected mode" is a mode in which an RRC connection is established between the mobile station UE and a radio network controller RNC. Establishment and release of an RRC connection change the mode of the mobile station UE as shown in FIG. 3.

An RRC connection is established between a mobile station UE and a radio network controller RNC, by a UE originated call from the mobile station UE or a reception of paging by the mobile station UE in the "Idle mode".

With reference to FIG. 4, the way in which an RRC connection is established when a mobile station UE in the "Idle mode" receives paging will be described.

As shown in FIG. 4, a switched network CN (Core Network) transmits, to a radio network controller RNC, a paging signal for a call in to the mobile station UE; and the radio network controller RNC transmits the paging signal to the mobile station UE. When the mobile station UE determines that the received paging signal is a signal to itself, it performs an RRC connection establishment procedure with the radio network controller RNC and makes the transition to the "Connected mode".

<Non-Patent Literature 1>

3$^{rd}$ Generation Partnership Project Technical Specification Group Terminals, 23.041 Technical realization of Cell Broadcast Service (CBS), October, 2000

<Non-Patent Literature 2>

3$^{rd}$ Generation Partnership Project Technical Specification Group Radio Access Network, 25.324 Broadcast/Multicast Control BMC, December, 2000

However, in the broadcast communication or the multicast communication in the conventional mobile communication systems, there is the problem that since a mobile station UE in the "Idle model" cannot establish a dedicated channel (such as a DCCH (Dedicated Common Control Channel) or DTCH (Dedicated Transport Channel)), a radio network controller RNC does not have any means of determining to which broadcast communication or multicast communication control information transmitted from the mobile stations UE through a common channel relates.

The present invention has been made in view of the above problem, and has an object of providing a mobile station which enables transmission of control information on broadcast communication or multicast communication to a radio network controller without establishing a dedicated channel in broadcast communication or multicast communication.

DISCLOSURE OF THE INVENTION

According to a first aspect of the present invention, there is provided a mobile station capable of handling broadcast communication or multicast communication, including a control information generating unit configured to generate control information on the broadcast communication or the multicast communication; a control information identifier adding unit configured to add a control information identifier for specifying a type of the control information to the control information; and a transmitting unit configured to transmit the control information to a radio network controller via a common channel.

In the first aspect of the present invention, the control information identifier adding unit may be configured to add a MAC header to the control information, and to insert the control information identifier in the MAC header.

Also, in the first aspect of the present invention, the control information identifier may be configured to be identification information for specifying the broadcast communication or the multicast communication, or multicast group ID in the multicast communication.

BEST MODE FOR CARRYING OUT THE INVENTION

Configuration of Mobile Station in Embodiment of the Invention

Figure 1:
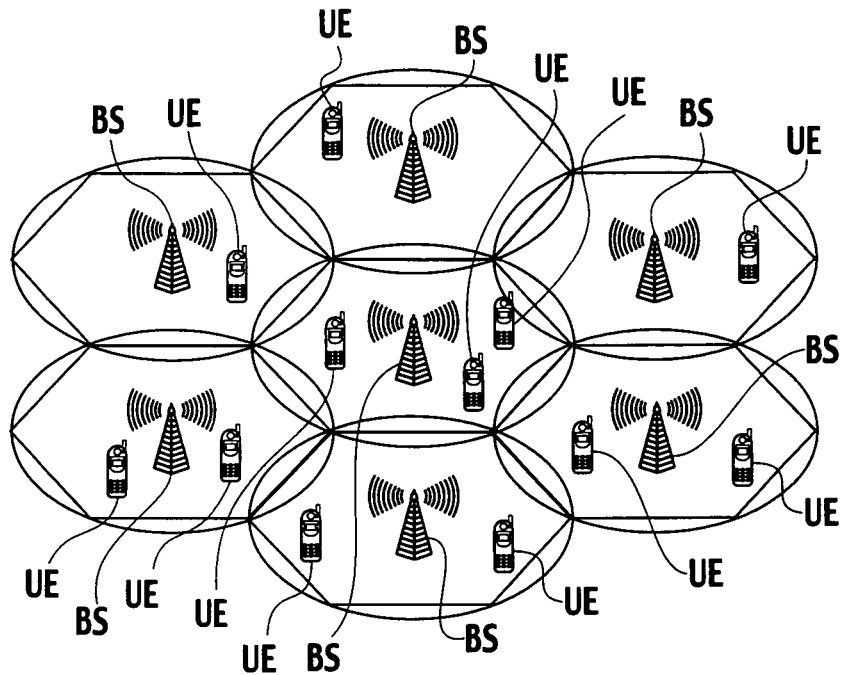
FIG. 1 is a diagram for illustrating broadcast communication according to a conventional art.
Figure 2:
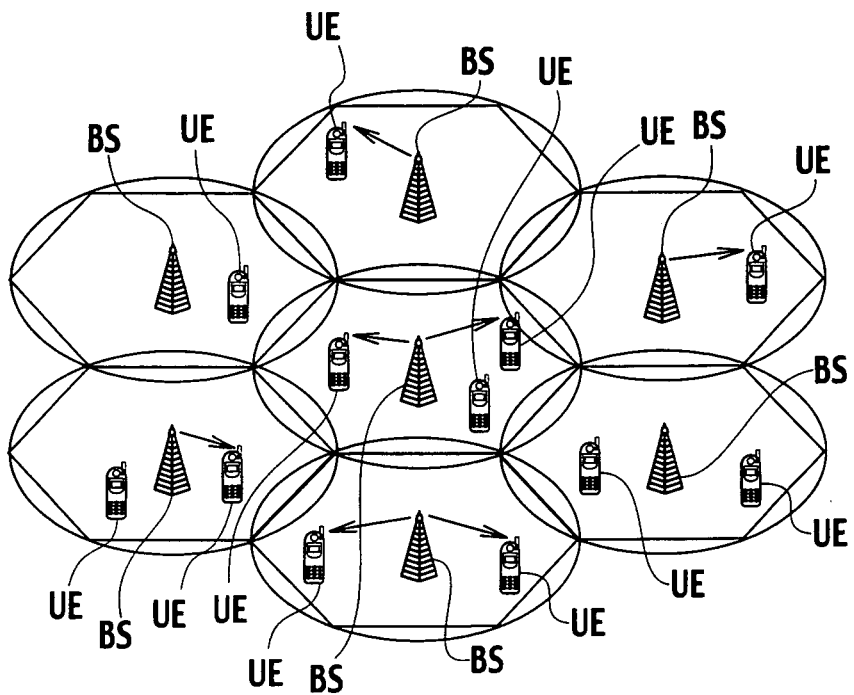
FIG. 2 is a diagram for illustrating multicast communication according to a conventional art.
Figure 3:
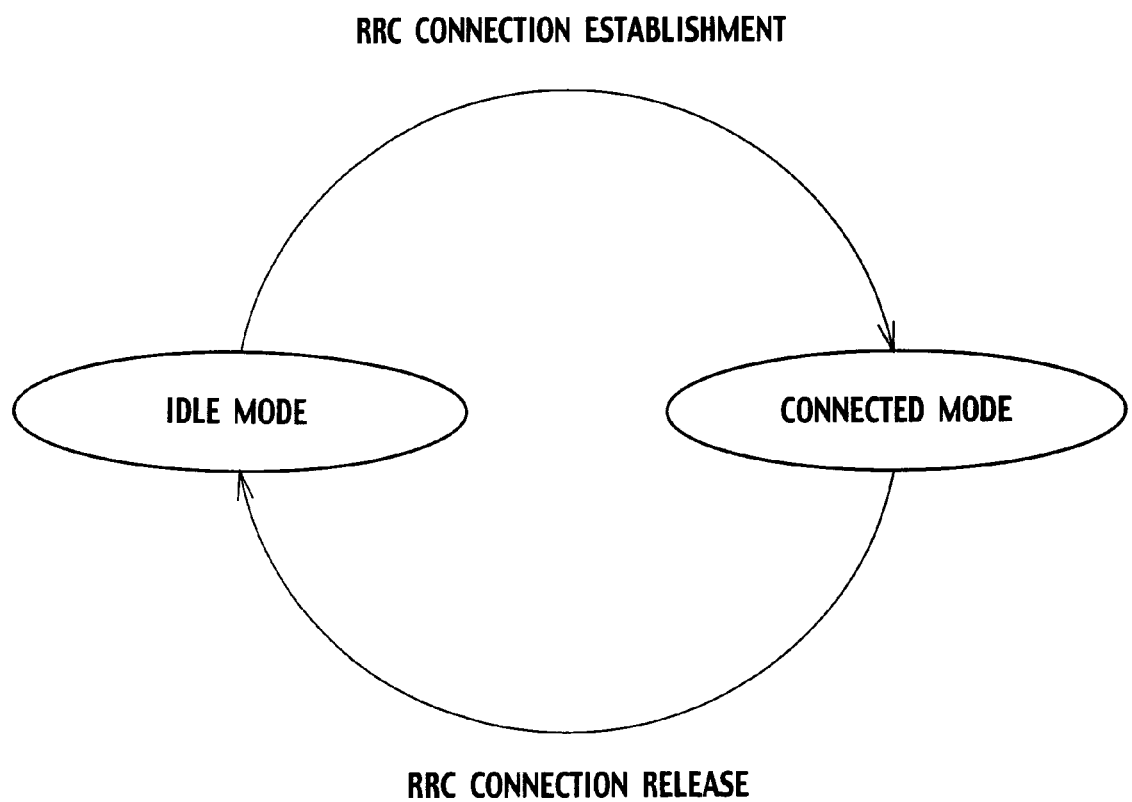
FIG. 3 is a diagram for illustrating broadcast communication according to a conventional art.
Figure 4:
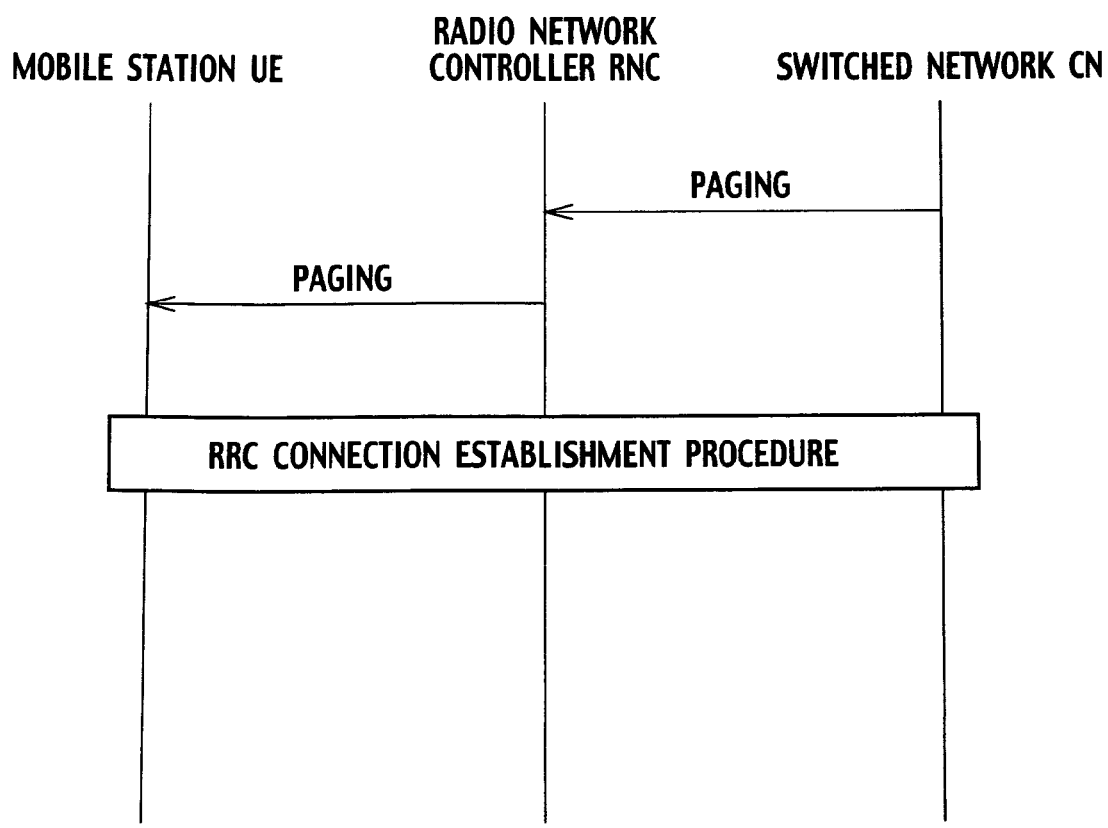
FIG. 4 is a diagram for illustrating broadcast communication according to a conventional art.
Figure 5:
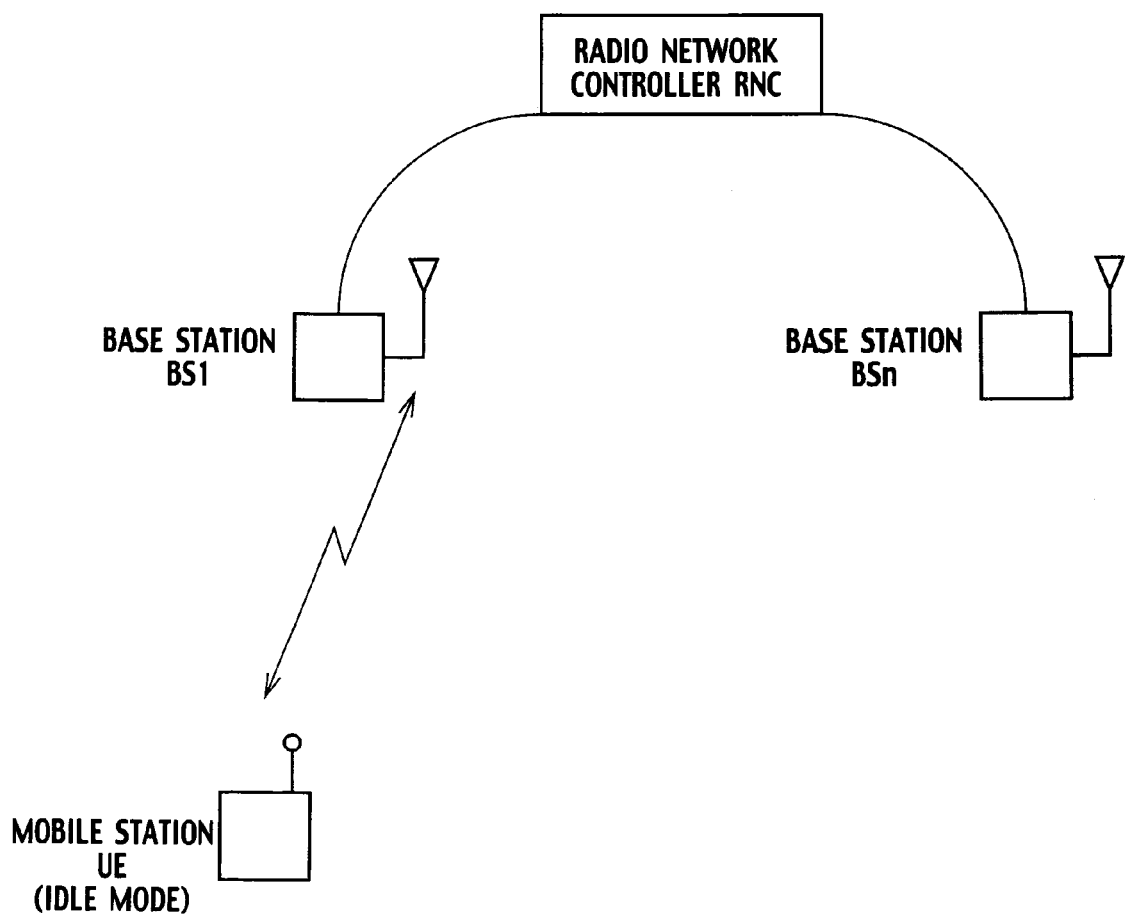
FIG. 5 is an overall configuration diagram of a mobile communication system including a mobile station according to an embodiment of the present invention.

FIG. 5 shows an overall configuration diagram of a mobile communication system according to an embodiment of the present invention. The mobile communication system according to this embodiment includes, as shown in FIG. 5, two base stations BS1 and BSn under a radio network controller RNC. A mobile station UE is in the "Idle mode", and is in communication with the base station BS1.

Figure 6:
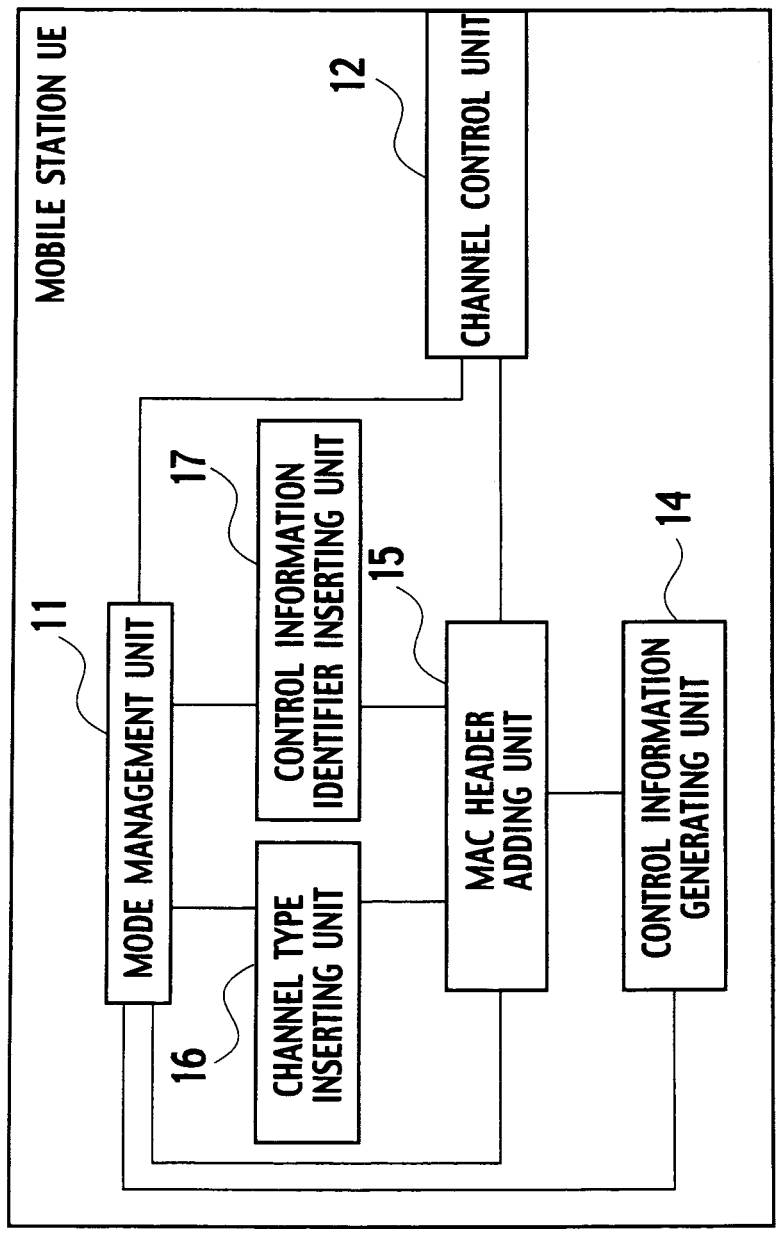
FIG. 6 is a functional block diagram of the mobile station according to the embodiment of the present invention.

FIG. 6 shows functional blocks of the mobile station UE according to this embodiment. The mobile station UE is a mobile station capable of handling broadcast communication or multicast communication, and includes, as shown in FIG. 6, a mode management unit 11, a channel control unit 12, a control information generating unit 14, a MAC header adding unit 15, a channel type inserting unit 16, and a control information identifier inserting unit 17.

The mode management unit 11 is configured to manage the mode ("Idle mode" or "Connected mode") of the mobile station UE.

The channel control unit 12 is configured to control establishment of a common channel or a dedicated channel with the radio network controller RNC and to control transmission and reception of information via the common channel or the dedicated channel. The channel control unit 12 cannot establish a dedicated channel with the radio network controller RNC when the mobile station UE is in the "Idle mode".

The control information generating unit 14 is configured to generate control information on broadcast communication or multicast communication when the mobile station UE is in the "Idle mode". For example, the control information includes a request for joining ("Join") or a request for leaving ("Leave") to a given multicast group.

Figure 7:
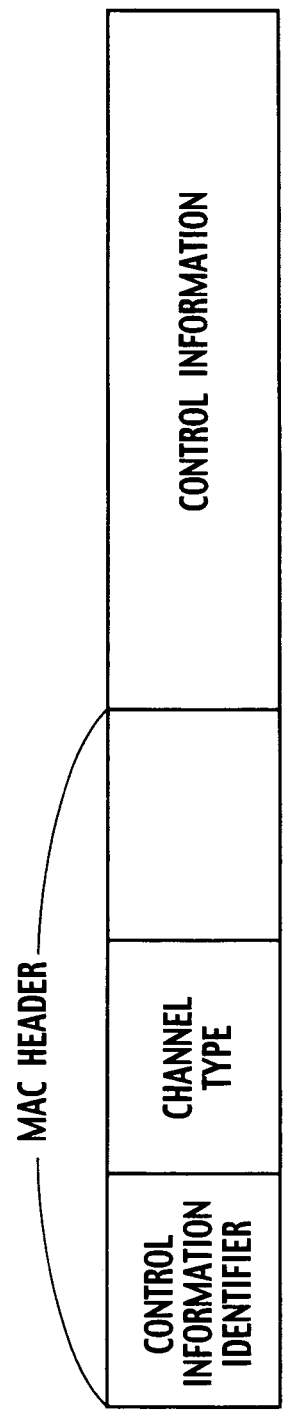
FIG. 7 is a diagram showing an example of a format of control information transmitted by the mobile station in the embodiment of the present invention.

The MAC header adding unit 15 is configured to add a MAC header to control information generated by the control information generating unit 14 as shown in FIG. 7.

The channel type inserting unit 16 is configured to insert a channel type showing whether control information should be transmitted on a dedicated channel or on a common channel, in a MAC header added to the control information by the MAC header adding unit 15, as shown in FIG. 7.

However, when the mobile station UE is in the "Idle mode", the channel type inserting unit 16 may be configured not to insert a channel type in a MAC header because the channel control unit 12 cannot establish a dedicated channel.

The control information identifier inserting unit 17 is configured to insert a control information identifier for identifying control information (e.g., "Join" or "Leave"), in a MAC header provided to the control information by the MAC header adding unit 15, as shown in FIG. 7.

The control information identifier may be identification information for specifying broadcast communication or multicast communication (e.g., MBMS identification information), or multicast group identification information in multicast communication, for example.

The MAC header adding unit 15, the channel type inserting unit 16 and the control information identifier inserting unit 17 constitute a control information identifier adding unit for adding a control information identifier to control information, and also constitute a MAC layer architecture of the mobile station UE.

Operation of Mobile Station in Embodiment of the Invention

Figure 8:
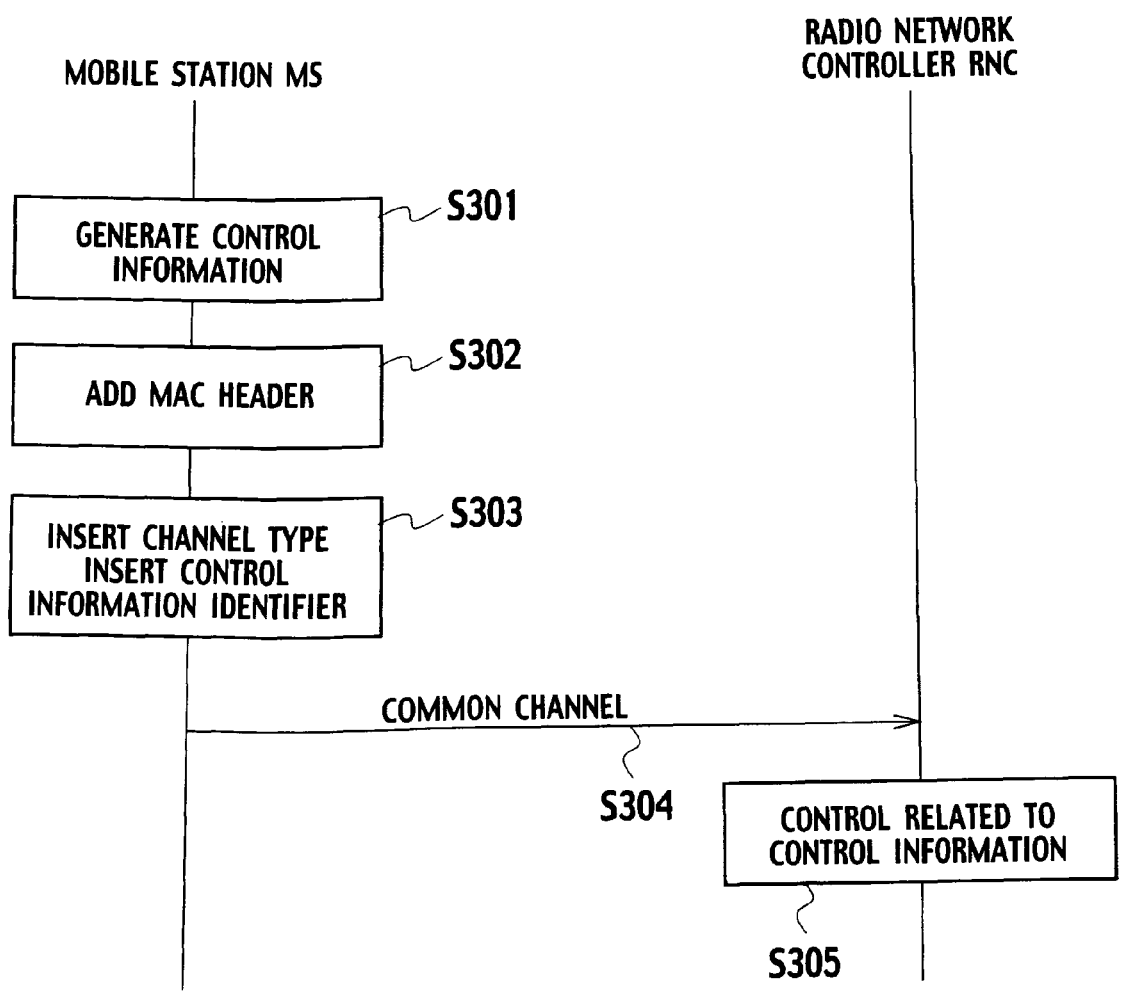
FIG. 8 is a sequence diagram showing operation in the mobile communication system including the mobile station according to the embodiment of the present invention.

With reference to FIG. 8, operation of the mobile station according to this embodiment will be described.

In step 301, the control information generating unit 14 of the mobile station UE in the "Idle mode" generates control information on broadcast communication or multicast communication.

In step 302, the MAC header adding unit 15 adds a MAC header to the control information generated by the control information generating unit 14.

In step 303, the channel type inserting unit 16 inserts a channel type in the MAC header added to the control information by the MAC header adding unit 15; and the control information identifier inserting unit 17 inserts a control information identifier in the MAC header.

In step 304, the channel control unit 12 transmits the control information with the MAC header to the radio network controller RNC via a common channel.

In step 305, the radio network controller RNC analyzes the MAC header added to the control information received via the common channel, and performs control related to the control information, based on the control information identifier inserted in the MAC header.

Specifically, the radio network controller RNC counts the number of mobile stations UE in the "Idle model" which want to join a given MBMS, the number of mobile stations UE in the "Idle mode" which want to leave a given MBMS, and the like, based on control information identifiers in MAC headers added to control information received from a plurality of mobile stations UE in the "Idle mode".

In this regard, even when a radio network controller RNC according to a conventional art receives control information from a mobile station in the "Idle mode" via a common channel, it cannot determine to which MBMS the control information relates, and thus cannot count the number of mobile stations UE in the "Idle mode" which want to join a given MBMS, the number of mobile stations UE in the "Idle mode" which want to leave a given MBMS, and the like.

In the case where mobile station IDs are included in MAC addresses added to control information received from a plurality of mobile stations UE in the "Idle mode", the radio network controller RNC may be configured to perform Join processing or Leave processing on the mobile stations identified by the mobile station IDs, based on the control information.

Effects of Mobile Station in Embodiment of the Invention

The mobile station according to this embodiment allows a radio network controller RNC to determine to which broadcast communication or multicast communication control information transmitted from the mobile station UE relates, based on a control information identifier added to the control information.

Also, the mobile station according to this embodiment can transmit control information on broadcast communication or multicast communication without establishing a dedicated channel with a radio network controller RNC, resulting in effective utilization of radio resources and improved efficiency in battery consumption.

INDUSTRIAL APPLICABILITY

As described above, the present invention can provide a mobile station which enables transmission of control information on broadcast communication or multicast communication to a radio network controller without establishing a dedicated channel in broadcast communication or multicast communication.

The invention claimed is:

1. A mobile station capable of handling a broadcast communication or a multicast communication, wherein:
the mobile station is configured to generate control information including a request to join the broadcast communication or the multicast communication or a request to leave the broadcast communication or the multicast communication, when the mobile station is in an idle mode, to add, to the control information, a control information identifier for specifying a type of the control information, and to transmit the control information to a radio network controller via a common channel, without establishing a dedicated channel, and the control information identifier is identification information for specifying the broadcast communication or multicast communication or multicast group identification information in the multicast communication.

2. The mobile station as set forth in claim 1, wherein the mobile station is configured to add a MAC header to the control information, and to insert the control information identifier in the MAC header.

3. The mobile station as set forth in claim 1, wherein the control information identifier is identification information for specifying the broadcast communication or the multicast communication, or multicast group identification information in the multicast communication.

4. The mobile station as set forth in claim 2, wherein the control information identifier is identification information for specifying the broadcast communication or the multicast communication, or multicast group identification information in the multicast communication.

* * * * *

UNITED STATES PATENT AND TRADEMARK OFFICE
CERTIFICATE OF CORRECTION

PATENT NO. : 8,682,276 B2  
APPLICATION NO. : 10/569067  
DATED : March 25, 2014  
INVENTOR(S) : Sung Uk Moon et al.

Page 1 of 1

It is certified that error appears in the above-identified patent and that said Letters Patent is hereby corrected as shown below:

On the title page, Item (30), the Foreign Application Priority Data Information has been omitted.
Below Item (65) insert:

--(30)  Foreign Application Priority Data

Aug. 21, 2003  (JP)................................2003-208291--

Signed and Sealed this
Twenty-fourth Day of June, 2014

Michelle K. Lee
*Deputy Director of the United States Patent and Trademark Office*